United States Patent [19]
Flynn

[11] 3,901,833
[45] Aug. 26, 1975

[54] HARDENABLE EPOXY RESIN COMPOSITIONS AND PROCESS FOR MAKING THE SAME

[75] Inventor: Robert Flynn, Toms River, N.J.

[73] Assignee: Ciba-Geigy Corporation, Ardsley, N.Y.

[22] Filed: July 14, 1972

[21] Appl. No.: 271,872

Related U.S. Application Data

[63] Continuation-in-part of Ser. No. 83,626, Oct. 23, 1970, Pat. No. 3,679,465, which is a continuation-in-part of Ser. No. 877,477, Nov. 17, 1969, abandoned.

[52] U.S. Cl. ..... 260/2 EP; 117/119.6; 117/126 GE; 260/18 PF; 260/47 EP; 260/59
[51] Int. Cl. ..................... C08g 53/00; G08g 53/02
[58] Field of Search ..... 260/47 EP, 59, 18 PF, 2 EP

[56] References Cited
UNITED STATES PATENTS

| | | | |
|---|---|---|---|
| 3,198,850 | 8/1965 | Levantin | 117/161 ZB |
| 3,479,302 | 11/1969 | Saran | 260/2 |
| 3,523,037 | 8/1970 | Chellis | 260/47 |
| 3,634,326 | 1/1972 | Aubry | 260/47 |

Primary Examiner—Melvin Goldstein
Assistant Examiner—E. A. Nielsen
Attorney, Agent, or Firm—Vincent J. Cavalieri; Nestor W. Shust

[57] ABSTRACT

A curable composition comprising a mixture of an epoxy resin and a hardener can be prepared by dissolving the resin and curing agent in a low boiling solvent and flashing off the solvent at temperatures in excess of 400°F, the evaporating solvent cooling the composition and minimizing precure of the resin.

Reinforced composites can be prepared by passing a supporting material such as a continuous web strand or roving through the resin solution and thereafter heating at temperatures above 400°F to remove the solvent without appreciably precuring the resin.

The curable epoxy compositions can be used for molding, laminating and the like.

5 Claims, 1 Drawing Figure

FIG. 1

HARDENABLE EPOXY RESIN COMPOSITIONS AND PROCESS FOR MAKING THE SAME

CROSS-REFERENCE TO RELATED APPLICATIONS

This application is a continuation-in-part of U.S. Ser. No. 83,626, filed Oct. 23, 1970 now U.S. Pat. No. 3,679,465, which issued on July 25, 1972, which application is a continuation-in-part of U.S. Ser. No. 877,477, filed Nov. 17, 1969, and now abandoned.

BACKGROUND OF THE INVENTION

The epoxy compositions with which this invention is concerned are thermosetting systems formulated to meet various processing techniques and applications requirements. They usually include the resin and the curing agent together with extenders or reinforcements. These latter materials are virtually indispensable in many applications; and were used, the problem the art faces is in providing the resin, the curing agent and the reinforcements together in a stable system which can subsequently be transformed into desired articles by curing in, for example, a compression or transfer molding process. A simple blending technique is not suitable, especially where reinforced articles are used, because the reinforcement material must be used as relatively large particles to perform well. The presently available methods for producing curable reinforced resin compositions generally involve coating or impregnating the suitable reinforcement material with the resin and its curing agent. These techniques, however, suffer from one or more disadvantages which renders them unsuitable for producing compositions from highly reacted components such as epoxy materials.

DESCRIPTION OF THE PRIOR ART

In the conventional methods employed, the elevated temperatures required during the process of coating or impregnating a support with a resin and curing agent are in the range of the temperatures used for actual molding and tend to cause the resin and the curing agent to react to an undesirable degree. While this reaction may be quite slow and relatively incomplete, depending on the particular materials used, in general the characteristics of the composition are so deleteriously affected that in many instances the final product is practically worthless.

In attempting to arrive at a suitable intermediate solid, tack free and which has good curing properties, the prior art has attempted a variety of techniques. For example, prior artisans have blended powdered curing agents with powdered epoxy resins. Alternatively, a solid epoxy has been melted, the curing agent added and the mixture cooled and pulverized.

Respecting the incorporation of fillers, the prior art has attempted the so-called hot melt process wherein the materials are melted at an elevated temperature and a reinforcement material blended into the hot melt. The degree to which the material is coated by the resin and curing agent (and thus the ultimate properties are the final composition) is in part a function of the systems viscosity. This in turn is a function of the melt characteristics of the resin and the curing system and the fabrication temperature used. Additionally, resins and curing agents having both low melting points and widely useful characteristics as final products are not generally known. This particular method has drawbacks which render it unsuitable for making such materials as epoxy molding compounds.

Another technique involves the use of systems which are liquid per se, as liquid resins and curing agents as direct coatings on reinforcement material. This system, like the hot melt system, is not of broad use and, after coating, the epoxy system must be advanced, i.e. cured so as to yield a solid tack free composites at room temperature. This requires controlled curing in order to produce a uniform composite with attendant expenses of process control.

Yet another technique has involved the use of a solvent to reduce the viscosity of either liquid systems or to solubilize solid resin/curing agent systems with subsequent application of the resulting liquid to the reinforcement material. The technique, however, is attended by considerable difficulties when applied to epoxy systems. Typically, this approach involves dissolving the resin and curing agent in a solvent, applying this solution somehow to reinforcement materials, such as roving for example, and then removing the solvent to leave behind a resin/curing agent system. The major problem is in removing the solvent so as to leave a resin curing agent composition which will have desirable physical properties when molded. On the one hand, high temperature solvent removal causes the epoxy systems to advance or precure at a point in time when this is intolerable. On the other hand, low temperature solvent removal often results in rapid removal of the solvent from the surface of the coating while remaining solvent below the surface is prevented from evaporating by the solid skin that is formed. This is quite a serious problem in processes where the resin system is being applied continuously to filamentous or fibrous materials such as roving or gauze and the like. In any case compositions produced from such material often fail to have acceptable mechanical or electrical properties in one respect or another.

To date, the prior art has been unable to obtain a satisfactory dry, solid tack-free epoxy composite based on a solid resin and more particularly has been unable to obtain a dry, solid tack-free reinforced composite having the combination of a. good flow characteristics,
b. rapid curing and,
c. low solvent level.

The prior art has thus employed a variety of methods to obtain composites having desired characteristics. The typical fabrication technique employed by the prior art is to dissolve either a highly functional solid resin or a liquid resin in a solvent, add a curing agent and impregnate or coat a desired substrate. Following the coating the solvent is removed at relatively low temperatures, typically 250° to 320°F and thereafter the resin is advanced to the desired degree by exposure of temperatures of 300° to 350°F. In this way, there is obtained a substantially advanced resin which, because it is already partially cured, cures relatively rapidly. This partially cured resin still has some flow although substantially less than the starting material because of the resin/curing agent advancement. This partially cured resin, of course, has a low solvent content. Typical of the prior art approaches to the problem are U.S. Pat. No. 3,523,037 and U.S. Pat. No. 3,480,471. These references generally teach that it is known to manufacture preimpregnated webs containing epoxy resin by first impregnating a supporting material used with an poxy resin solution containing a curing agent and hereafter evaporating the solvent by heat treatment. The resulting impregnated webs can thereafter be ressed with application of heat and pressure to form minates. Where liquid epoxy resins are employed it is enerally desirable to obtain, after impregnation, a ontacky prepreg. This is accomplished after the solent has been evaporated by exposing the impregnated eb for a certain period of time to a higher temperare during which a portion of the curing agent reacts ith the epoxy resin and the latter is converted into a igher molecular, higher viscosity solid but still fusible prelengthened" state (the so-called "B-stage").

It can be seen that in no case is the prior art able to btain a dry, solid, tack-free reinforced composite hich has the combination of good flow characteristics, rapid curing, low solvent level and substantial retention of the original epoxy value.

SUMMARY OF THE INVENTION

This invention relates to dry, solid, tack-free curable poxy resin compositions comprising an epoxy resin nd a curing agent, the composition characterized by solvent content below about 0.5% and a retained poxy value of at least 75%. In one aspect, the invenion relates to those systems wherein curable epoxy esin compositions are applied to continuous reinforcement materials. One embodiment relates to the prepation of chopped prepreg for molding. In another embodiment the invention relates to impregnated filament or filament winding. In yet another embodiment the invention relates to impregnated web for laminating another aspect of the invention relates to the preparaon of curable epoxy resin compositions. In one embodiment of this aspect of the invention an epoxy resin nd a curing agent therefor are dissolved in a low boilig solvent, a reinforcing substrate such as a web, trand or roving is passed through the solution and the olvent is thereafter flashed off at elevated temperaures whereby the resin composition is evaporatively ooled and precure of the resin is minimized.

In another aspect of this invention a normally solid poxy resin and a curing agent therefor are dissolved in low boiling solvent and the resulting solution is dried t elevated temperature to recover a curable resin composition characterized by a solvent content below bout 0.5% and a retained epoxy value of at least 75%. n one embodiment of this aspect of the invention the olution of epoxy and hardener is spray dried at eleated temperatures to yield a powdered curable composition. In another embodiment of this aspect of the vention the solution of epoxy resin and hardener is netered onto an impervious support, such as a stainless eel tape and exposed to elevated temperatures to dry he composite. The resulting curable film or tape can e stripped intact from the support. Such films are usel per se, as adhesives and can be pulverized to form owdered resins. In yet another embodiment of this asect of the invention the solution of epoxy resin and ardener can be mixed with fillers and extenders, the esulting composition metered onto an impervious support such as a stainless steel tape and dried at elevated emperatures. The resulting composition can be reoved from the substrate and comminuted to yield ansfer and compression molding compositions.

As can be seen from the above, an important step in the practice of the invention is the preparation of a solution of epoxy resin and a curing agent. The choice of solvent is, of course, significant to the concept that a low boiling solvent used in conjunction with a high energy rapid drying step will absorb most of the energy of the drying step as the solvent evaporates with very little, if any, energy being diverted to undesirable curing or "B-staging" of the epoxy resin. As a general proposition, the solvents suitable for use herein are those organic solvents which have a low boiling point at atmospheric temperature. By "low boiling" is meant solvents boiling in the range of from about 30°C to about 100°C at atmospheric pressure and preferably, in the range of from about 40° to 80°C. A wide variety of solvents in the indicated boiling range is available, as exemplified by the following table:

TABLE 1

| Solvent | B. P. °C |
|---|---|
| furan | 31 |
| methyl formate | 32 |
| diethyl ether | 34.6 |
| methylal | 42 |
| ethyl formate | 54 |
| acetone | 56.5 |
| methyl acetate | 57 |
| 1,1-dimethoxyethane | 64.5 |
| ethyl acetate | 77.1 |
| methyl ethyl ketone | 79.6 |
| methyl propionate | 79.7 |
| 1,2-dimethoxy ethane | 82.5 |
| t-butyl acetate | 97 |
| diethylketone | 101.5 |

As a general proposition, the halogenated solvents are undesirable due to their toxicity at elevated temperature but, if this factor is acceptable, the halogenated solvents boiling in the indicated range are operable. The alcohol solvents are undesirable because of the problem of potential reactivity between the alcoholic groups and the epoxide groups. The preferred group of solvents are the ketone solvents with acetone and methyl ethyl ketone being preferred and acetone being especially preferred.

In producing the epoxy resin solution described, virtually any epoxy resin normally employed in the production of cured products can be used successfully. The resin actually selected will depend upon the properties desired in the final product and, therefore, such selection is largely within the discretion of the user. Although the invention is particularly useful in treating highly reactive resins, for example, those with several epoxide groups per molecule, there can also be successfully employed those epoxy compounds containing two or more epoxy groups. It is a particular advantage of this invention that the major part of the resin functionality is retained obviating the need for polyfunctional resins and making the ordinary and commonly available resins useful in the manufacture of curable epoxy compositions. Further, there can be used solid, liquid and mixtures of solid and liquid resins.

The resins can be aliphatic, cycloaliphatic, aromatic, heterocyclic and the like and may carry such inert substituents as chlorine and others well known and commonly encountered in the art. The resins can be monomers or polymers, and they can also contain either linkages and ester groups as well. There can be used virtually any epoxide produced from a polyhydric alcohol of phenol and an epihalohydrin. Typical of the epoxides that can be used successfully, are those produced from epichlorohydrin and a polyhydric phenol or alcohol such as resorcinol, catechol, 1,2,6-hexanetriol, sorbitol, mannitol, pentaerythritol, trimethylolpropane and glycerol allyl ether. Similarly, polymeric materials containing polyhydric hydroxyls such as appropriately substituted polyethers and polyesters can likewise be employed. For example, there may be employed vinyl cyclohexane dioxide, epoxidized mono-, di- and triglycerides, butadiene dioxide, 1,4-bis(2,3-epoxypropoxy) benzene, 1,3-bis(2,3-epoxypropoxy)benzene, 4,4'-bis(2,3-epoxypropoxy)diphenyl ether, 1,8-bis(2,3-epoxypropoxy) octane, 1,4-bis (2,3-epoxypropoxy)cyclohexane, 4,4'-bis(2-hydroxy-3,4-epoxybutoxy) diphenyldimethylmethane, 1,3-bis(4,5-epoxypentoxy)-5-chlorobenzene, 1,4-bis(3,4-epoxybutoxy)2-chlorocyclohexane, diglycidyl thioether, diglycidyl ether, ethylene glycol diglycidyl ether, resorcinol diglycidyl ether, 1,2,5,6-diepoxyhexane-3, 1,2,5,6-diepoxyhexane, and 1,2,3,4-tetra(2-hydroxy-3, 4-epoxybutoxy)butane.

Particularly preferred are epoxides prepared from bisphenol-A (2,2-bis[4-hydroxyphenyl]propane) phenols or cresols and epichlorohydrin. Especially suitable as bisphenol A-epichlorohydrin polyepoxide resins of the formula and epoxidized poly(o-cresols) of the formula wherein $n$, $a$ and $b$ are positive numbers and R represents chlorohydrins, glycols, polymeric ether linkages and the like.

The curing agents used to effect the ultimate cure of the resin are those normally employed in the art. They can be the conventional hardeners, accelerators of the like which produce polymerization of a polyepoxide resin by reaction of the oxirane ring. Typically employed are primary and secondary amines, amides, polyamines and polyamides, phenols, novalacs and acid anhydrides. As suitable curing agents there may, for example, be mentioned: amines or amides such as aliphatic, cycloaliphatic or aromatic, primary, secondary and tertiary amines, for example monoethanolamine, ethylene diamine, hexamethylene diamine, trimethylhexamethylene diamine, diethylene triamine, triethylene tetramine, tetraethylene pentamine, N,N-dimethylpropylene diamine-1,3, N,N-diethylpropylene diamine-1,3, 2,2-bis(4'-aminocyclohexyl)propane, 3,5,5-trimethyl-3-(aminomethyl) - cyclohexylamine ("isophorone diamine"), Mannich bases such as 2,4,6-tris(dimethylaminomethyl) phenol; m-phenylene diamine, p-phenylene diamine, bis(4-aminophenyl)methane, bis(4-aminophenyl)sulphone and m-xylylene diamine; adducts of acrylonitrile or monoepoxides such as ethylene oxide or propylene oxide, to polyalkylene polyamines such as diethylenetriamine or triethylenetetramine; adducts from polyamines such as diethylenetriamine or triethylenetetramine in excess and polyepoxides such as bisphenol-A polyglycidyl ethers; ketimines, for example from acetone or methyl ethyl ketone and bis(p-aminophenyl)methane; adducts from monophenols or polyphenols and polyamines; polyamides, especially those from aliphatic polyamines such as diethylenetriamine or triethylenetetramine and dimerised or trimerised unsaturated fatty acids, such as dimerised linseed oil fatty acid ("Versamid"); polymeric polysulphide ("Thiokol"); dicyandiamide, and anilineformaldehyde resins; polyhydric phenols, for example resorcinol, 2,2-bis(4-hydroxyphenyl)propane or phenolformaldehyde resins; boron trifluoride and its complexes with organic compounds such as $BF_3$-ether complexes and $BF_3$-amine complexes, for example $BF_3$-monoethylamine complex; acetoacetanilide-$BF_2$ complex; phosphoric acid; triphenylphosphite; polybasic carboxylic acids and their anhydrices, for example phthalic anhydride, $\Delta^4$-tetrahydrophthalic anhydride, hexahydrophthalic anhydride, 4-methylhexahydrophthalic anhydride, 3,6-endomethylene - $\beta^4$- tetrahydrophthalic anhydride, methyl-3,6-endomethylene - $\Delta^4$- tetrahydrophthalic anhydride (=methylnadicanhydride), 3,4,5,6,7,7-hexachlor-3,6-endomethylene - $\Delta^1$ - tetrahydrophthalic anhydride, succinic anhydride, adipic anhydride, azelaic anhydride, sebacic anhydride, maleic anhydride, dodecenylsuccinic anhydride; pyromellitic acid dianhydride or mixtures of such anhydrides.

The curing agents can be used singularly or in combination of two or more. The amount used is not critical and will depend on the resin, the particular curing agent and the desired properties; a typical range is 80 to 150% of the stoichiometric amount although the actual amount may vary from this range depending upon the particular composition which is to be cured. For purposes of stoichiometric calculations, one epoxy group is considered to react with one reactive hydrogen.

Additionally, accelerators may be included in the system to increase the speed of reaction between the curing agent and the polyepoxide in its ultimate application, particularly when using polyhydroxides and polycarboxylic acid anhydrides as curing agents. Additionally, some accelerators may have a primary effect as a curing agent per se. Useful accelerators are, for example, tertiary amines, their salts or quaternary ammonium compounds, for example, 2,4,6-tris(dimethylaminomethyl)phenol, benzyldimethylamine, 2-ethyl-4-methyl-imidazole, triamylammonium phenolate; alkali metal alcoholates such as, for example, sodium hexanetriolate, dicyandiamide (cyanoguanidine), benzoguanamine, imidazole, isoniazide, tetramethyl diamine, benzyl dimethylamine, metaphenolene diamine and N,N,N',N'-tetramethyl-1, 3-butadiamine (TMBDA). The amount of accelerator is usually less than the amount of primary curing agent. As little as 0.1% ranging to the stoichiometric amount based on the weight of the polyepoxide, can be used to accelerate the curing reaction to a practical rate. The actual amount of accelerator used, however, will depend upon the composition which is to be cured. One significant advantage of this invention is that the epoxy hardener system can be sensitized by the addition of accelerators without undue precure.

The solution of one or more epoxide resins together with one or more curing agents and/or accelerators can be further mixed with usual modifiers such as reactive diluents, extenders, fillers, pigments, dyestuffs, plasticisers, levelling agents, flame-retardant materials and mold release agents. As exemplary of extenders, reinforcing agents, fillers and pigments which can be employed in the mixtures are anthracite tar, bitumen, glass fibers, boron fibers, carbon fibers, cellulose, polyethylene powder, polypropylene powder, mica, asbestos, quartz powder, slate powder, chalk powder, sand, dolomitic materials including calcium, magnesium and zinc carbonates, aluminum trihydrate, gypsum, antimony trioxide, bentones, silica aerogel, lithopone, barytes, titanium dioxide, carbon black, graphite, iron oxide or metal powder such as aluminum powder or iron powder. The epoxy resin compositions can, if desired, be flexibilized in a variety of ways. For example, the cross link density of the cured resin can be reduced by pre-reacting some of the epoxy groups, hardener groups or both. Another method of flexibilizing the epoxy compositions is to add long chain epoxy compounds.

In preparing the epoxy resin solution, the amount of the resin system (such as resin, curing agent and other solute materials) used in the solvent system can vary. It is convenient and preferred to use from 40 to 75 parts by-weight of solvent and 25 to 60 parts by-weight of the resin and any associated curing materials. In preparing the epoxy resin solution, this concentration of the solutes should be such as to provide a solution of conveniently handled viscosity. It has been found that the above ranges are adequate for this purpose.

Virtually any reinforcement material amenable to continuous flow through a bath solution and stable at the temperatures employed in the process can be used successfully. There can be used materials such as glass, boron, graphite, silicon, ceramic fibers, sapphire filaments, as well as such synthetic fibers as polyacrylonitrile, polyamide polyester and polyvinylalcohol. These materials can be used in the form of cloths, tapes, webs, rovings, etc.

The substrate is typically impregnated with a solution of epoxy resin, accomplished most conveniently by continuously passing the substrate through the epoxy resin solution at a speed sufficient to pick up on the substrate the desired amount of solution. This speed, of course, will vary with the reinforcement material used, the number of ends per strand and the number of filaments per end, the tension on the reinforcing substrate as it passes through the solution, the viscosity of the epoxy resin solution and similar factors normally encountered by and apparent to those skilled in the art. Respecting tension, it will be appreciated that the extensive coating on any material having closely packed filaments and ends will depend to some extent on the autness of the strand as it passes through the resin solution. It has been found that the best results are obtained in the ultimate compositions when from about 20 to 60% of the weight of the coated reinforcement material is constituted by the dry epoxy resin system coating. It will be appreciated by those skilled in the art that the amount of impregnation of the resin system (on a solid basis) applied on the reinforcement can be varied by altering a number of the process parameters such as those indicated above. In one aspect of the invention, fiberglass roving containing 15 to 30 ends per strand and 204–408 filaments per end will pick up a desired amount of resin material from the resin solution when moving at temperature-speed relationships indicated in FIG. 1.

After the reinforcing substrate has been coated to the desired level, the now solvent-wet composite is dried at elevated temperature conditions to substantially completely remove the solvent and to leave behind the dry resin/curing agent solid system in a substantially unadvanced state. Alternatively, the solution of epoxide resin/curing agent and filler, if any, can be subjected to high energy drying per se, for example, spray drying at elevated temperature to substantially completely remove the solvent and to leave behind the resin/curing agent solid system in a virtually unadvanced state. It should be noted that by the practice of this invention it is possible to remove upward of 99% of the solvent without substantially advancing the cure of the resin, a proposition that could not be achieved heretofore. More specifically, by the practice of this invention there is obtained a curable composition which comprises a resin and hardener or resin, hardener and reinforcing substrate, said compositions being characterized by a solvent content below about 0.5% and the retained epoxy value of at least 75%. The percentage of solvent is based on the entire weight of the resin and substrate where applicable. In a normal atmospheric environment the upper temperature limitation of the system is governed by the auto-ignition point of the solvent use. However, when a blanket of inert gas, such as nitrogen or carbon dioxide is used, still higher temperatures can successfully be employed. The rate of passage of the coated or impregnated substrate increases with increasing temperature, as is evidenced by FIG. 1. It goes without saying that it is most desirable to use the highest possible rate and although it is possible to achieve rates in excess of 50 feet per minute, it has been found convenient to adjust the temperature so as to permit a rate of from 5 to 50 feet per minute, more usually from about 20 to about 45 feet per minute.

The temperature range can vary from about 400°F to the flash point of the solvent being used. More generally, the temperature range will be from about 400°F to about 950°F. As a general proposition, the higher the temperature, the faster is the production rate and, of course, is shorter the residence time. The combination of time and temperature should not be so great as to appreciably effect the curing of the resin, yet at the same time, these parameters should not be so low in magnitude as to result in incomplete solvent removal.

As indicated above, the factors of time and temperature are adjusted to yield the product having a solvent content below about 0.5% and having a retained epoxy value of at least 75%.

The temperatures normally employed are substantially in excess of subsequent molding temperatures and it is indeed surprising that such low precuring is obtained under these conditions. In fact, the present process permits very high temperature exposure of the curable system and results in less curing as experienced with any other technique. While for most holding applications, it is acceptable if there remains, after solvent removal, more than about 50% of the total epoxy groups originally available for curing, the practice of this invention readily and routinely affords resin compositions having a retained epoxy value in excess of 75%.

In one embodiment of practicing the invention, resin composition having at least 75% retained epoxy value can be routinely obtained using temperatures as low as 300°F, preferably from about 400° to about 950°F and most preferably from about 550° to about 850°F and this especially preferably when acetone is used as the sole solvent.

As indicated, the characteristics of low solvent retention and higher retained epoxy value are a function of exposure time and temperature, with higher temperatures requiring shorter exposure times. It is preferred to use the highest temperature and shortest dwell time possible. It has been found, for example, that for a 6 foot heated column used as a drying tower it is possible to obtain reinforcement speed rates of from 5 to 50 feet per minute. Similar considerations apply to spray dried material.

Figure 1:
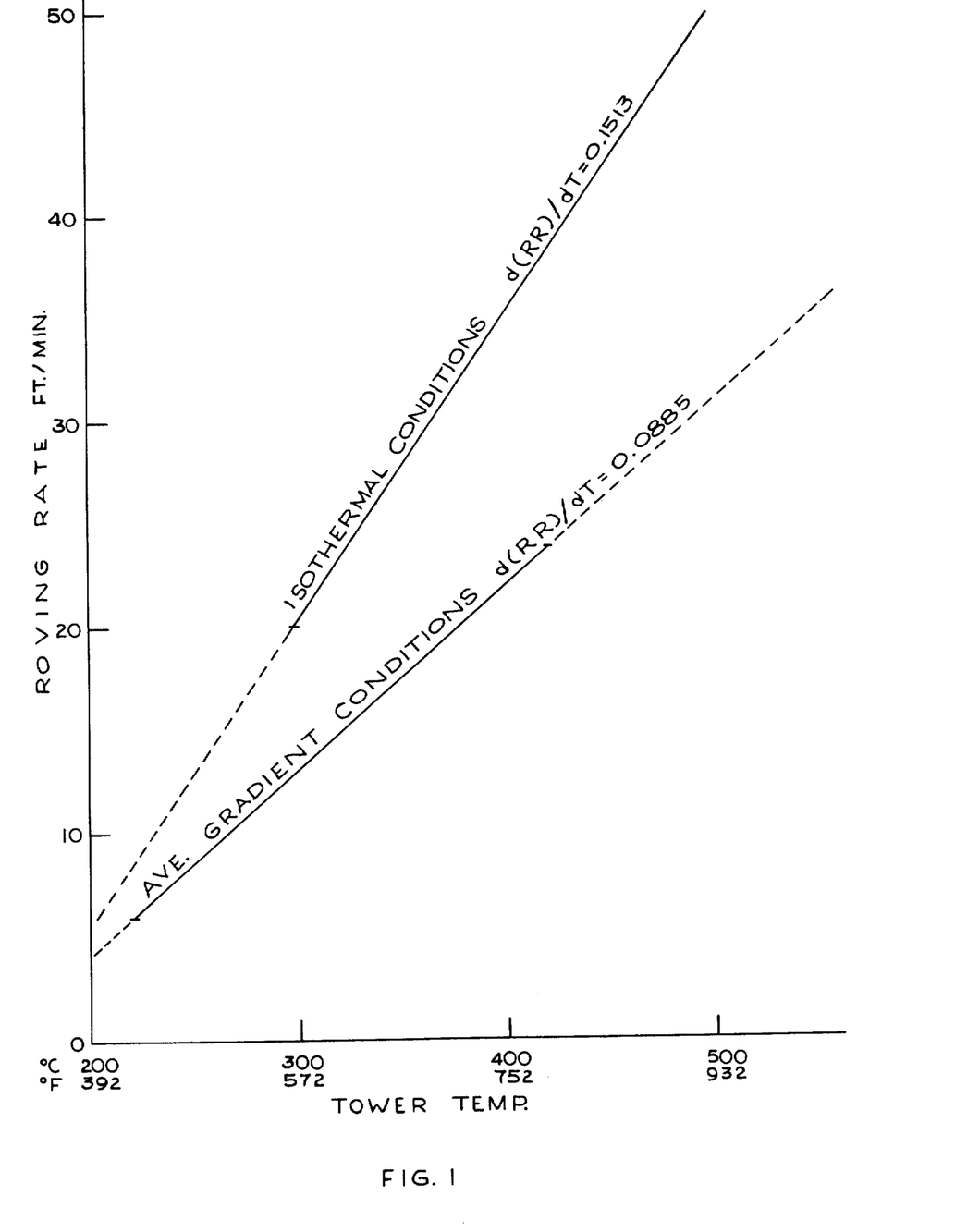

In some instances, when reinforced material is being employed, it is desirable to divide the drying tower into several sections, three for example, and provide gradually reducing temperatures. Thus, for example, that portion of the tower first encountered by the coated material can be set at the appropriate temperature with subsequent decreases in the temperature of other sections depending upon desired results. In some cases it has been found convenient to direct forced air as a cooling medium onto the coated material as it leaves the drying column. It is also helpful in many cases to have a flow of air or nitrogen running through the column to aid in removal of the vaporized solvent. It is an especially preferred embodiment of this invention to employ substantially isothermal conditions for drying. By substantially isothermal conditions is meant a differential of no more than 50° Fahrenheit between the temperature of the tower first encountered by the coated material and the temperature of the tower where the material exits. Isothermal conditions are preferred because it has been found possible to obtain maximum production rates by use thereof. This proposition is illustrated by FIG. 1.

Following the drying step, the dried material is typically collected and, if desired, collected and chopped into small staples in a manner well known to form chopped prepreg or, in the case of impregnated tapes, the tapes collected and, if desired cut into convenient sizes or subsequent lamination, or in the case of an unsupported film, recovered as such or comminuted to form powders. Laminated compression and transfer molded articles can be subsequently prepared by known techniques. As a result of the invention, the preparation of such articles is facilitated by the very desirable flow and handling properties of reinforced material.

Physical properties of the final molded products made from epoxy preimpregnated chopped strand premixed molding compounds (chopped prepregs) are excellent, possessing flexible strengths in excess of 50,000 psi, tensile strength in excess of 22,000 psi, impact strength in excess of 18 foot pounds per inch of notch and typical Barcol hardness above 60. Such epoxy impregnated chopped strand premixed molding compounds have a resin content of from 34 to 40%, a ¼ to 1 inch fiber length, a bulk density below 0.35, a bulk factor below 1.5 and the capacity to be compression molded at pressures of 950 psi or less and are impregnated with an unpigmented epoxy resin. As previously indicated, pigments, colorants and other fillers can be used as desired.

The invention thus provides a method for handling epoxy systems heretofore considered to be too sensitive for the preparation of epoxy compositions. All this is achievable without sacrificing any of the normally desirable characteristics of molding compounds. Materials produced according to this invention can be compression molded using low mold close times at standard curing temperatures and lower mold pressures. The net result is to provide for faster cycles, a superior product and lower mold pressure.

The following examples are given to illustrate specific embodiments of the invention. In each example, unless otherwise indicated, the following procedure was used.

A fiberglass roving was continuously passed at room temperature through a bath of an epoxy resin solution containing an epoxy resin, a curing agent and other ingredients as indicated, at the designated speed and tension. The roving picked up resin solution from the bath and was directed out of the bath and into the bottom of a vertical six foot drying column. The column was divided into three 2 foot sections heated as indicated. The air intake to the tower is room temperature air so as to provide a temperature gradient through the tower. As the coated roving left the drying tower, it was cooled with forced air and introduced into a chopper where it was chopped into 0.5 inch staple lengths. The chopped material was then compression molded and gave items having the indicated properties.

EXAMPLE 1

Epoxy Resin Solution (40% solids)
   Araldite 7065[1]          1200 grams
   Aniline/formaldehyde[2]    138 grams
      curing agent
   acetone                   1800 grams
   dimethyl formamide         168 grams
   water                       36 grams
Reinforcement Material
   Fiberglass roving - 30 end strand (204 filaments/end)

|  | A | B | C |
|---|---|---|---|
| Roving Rate - ft./min. | 7.0 | 10 | 20.0 |
| Roving Tension - grams | 800 | 800 | 800 |
| Tower Temp.°C.-bottom | 290 | 340 | 440 |
| Tower Temp.°C.-middle | 275 | 325 | 425 |
| Tower Temp.°C.-top | 250 | 300 | 400 |
| % Volatiles remaining | 0.3 | 0.3 | 0.3 |
| % Resin Pickup | 33.3 | 37.3 | 36.9 |

[1]Araldite 7065 is a bisphenol A-type of epoxy resin prepared from epichlorhydrin and has the formula hereinabove previously set forth. It has an epoxy value average of 0.21 equivalents per 100 grams and is available from CIBA Corporation, Summit, New Jersey.

[2]Curing agent- an aniline/formaldehyde resin (mol ratio 1/0.624) prepared by adding a mixture of 608 parts of 37.0% formaldehyde and 690 parts of 31% HCl to 1118 parts of aniline preheated to 60°C. During its addition the mixture is agitated and the temperature maintained at 90°C. After addition, the temperature is maintained at 80°C until the formaldehyde is completely consumed (about 2 hours). Thereafter, 540 parts of 50% sodium hydroxide is added, the aqueous layer separated and the resin washed with water at 80°C until the pH of the wash water is 7.5. Volatiles are then removed under vacuum to 130°C at 20 mm Hg.

[3]Epoxy value is defined as the fractional number of epoxy groups per 100 grams of material tested and is determined by dissolving the material in a minimum amount of acetone, adding benzyl alcohol and a water solution of bromophenol blue and potassium iodide bringing to reflux temperature and titrating with 0.5N hydrochloric acid.

Two of the final products were molded into ASTM Type I tensile bars at a molding temperature of 360°F, mold close time of 5 minutes with a 2 hour post cure at 300°F and had the following properties:

|  | A | C |
|---|---|---|
| Tensile strength at 25°C psi | 21,400 | 23,700 |
| % Elongation at failure | 0.52 | 0.64 |

Material produced in the same fashion as the above using the same formulation but changing roving speed to 10 ft./min. and the tension to 800 grams was molded into 2 inch 90° elbows, using conventional molding equipment. The mold close time was about 4 minutes with a molding temperature range of 340°-380°F using a clamp pressure of 2000 psi on a 14 inch ram and 1700 psi core pressure on a 1¾ inch ram (around 4 minutes). The elbow had a hydrostatic burst pressure of 2460 ± 219 psi.

It can be seen from the above results that the process of the invention yields moldable compositions of exemplary physical characteristics especially suitable for high pressure fluid flow systems. It does so using a very reactive epoxy resin/curing agent system. For example, the above epoxy resin solution gels in about 176–183 second at 172°C.

EXAMPLE 2

The procedure of Example 1 is followed varying the formulation and conditions as follows with the indicated results.

| Formulation | |
|---|---|
| Araldite 7065 | 1200 grams |
| Dicyandiamide (hardener) | 48 grams |
| N,N,N',N'-tetramethyl-1,3-butadiamine (TMBDA) (accelerator) | 3 grams |
| Acetone | 1660 grams |
| Water | 36 grams |
| Dimethylformamide | 168 grams |
| Reinforcement Material | |
| Fibreglass roving - 15 end strand | |
| Roving speed | 15 ft./min. |
| Roving Tension | 800–900 grams |
| Tower Temp.°C.-bottom | 340 |
| Tower Temp.°C.-middle | 325 |
| Tower Temp.°C.-top | 300 |
| % Resin Pickup | 32.50 |

The above materials were molded into a) a 2 inch, 90° elbow at 360°–380°F and 2000 psi compression pressure on a 14 inch ram and a 1700 psi core pressure on 1¾ inch ram, b) a standard ASTM Type I tensile bar (cured at 360°F and 1.5 ton pressure until gelled, followed by 4 tons pressure until cured), at a mold close time of 5 minutes (post cure 2 hours at 300°F). The elbow had an average burst value of 3030±202 psi (hydrostatic pressure) which constitutes an excellent material for high pressure fluid flow. The tensile bar exhibited at a tensile strength at 25°C of 26,500 psi and a per cent elongation at failure of 0.72.

The procedure was repeated using one gram of imidazole as an accelerator instead of the TMBDA. Per cent resin pickup was 32.7. An ASTM Type I tensile specimen was prepared as described above and shown to possess a tensile strength of 25,400 psi at 25°C and a % elongation of 0.71. Several 2 inch, 90° elbows were molded under conditions similar to those above (Cure Temperature 350°–360°F) and shown to possess an average hydrostatic burst pressure of 2,580 ± 533 psi.

EXAMPLE 3

The procedure of Example 1 was used varying the conditions and formulations as follows with the indicated results:

| Formulation | A | B | C |
|---|---|---|---|
| Araldite 7065 | 1200 | 600 | 0 |
| ECN 1280¹ | 0 | 600 | 1200 |
| Dicyandiamide | 48 | 72 | 96 |
| Benzyl dimethylamine (accelerator) | 6.2 | 5.0 | 3.8 |
| Water | 36 | 54 | 72 |
| Acetone | 1660 | 1603.2 | 1538 |
| Dimethyl formamide | 168 | 252 | 337 |
| % Solids content (calculated) | 40 | 40 | 40 |
| Roving tension - gram | 900–1000 | 900–1000 | 900–1000 |
| Roving Rate - ft./min. | 10.5 | 10.9 | 10.0 |
| Tower Temp.°C.-bottom | 340 | 340 | 340 |
| Tower Temp.°C.-middle | 325 | 325 | 325 |
| Tower Temp.°C.-top | 300 | 300 | 300 |
| Resin pickup | 36.7 | 36.5 | 35.0 |
| % Volatiles remaining | 0.41 | 0.53 | 0.68 |
| Tensile Strength - psi at 25°C (ASTM Type I) | 25,600 | 22,500 | 15,400 |
| % Elongation at Failure | 0.69 | 0.61 | 0.67 |

¹ECN 1280 is an epoxidized poly(o-cresol) resin having the formula hereinabove stated and a melting point of approximately 80°C. It is available from CIBA Corporation, Summit, New Jersey.

Each of the above formulations produces suitable molded articles although C has lower tensile properties. The composition being produced solely from a highly functional epoxide, offers improved chemical resistance and deflection temperature and is thus useful under a wide variety of conditions.

EXAMPLE 4

This example illustrates the use of different solvent systems.

| Formulation | A | B | C |
|---|---|---|---|
| Araldite 7065 (see Example 1) | 1200 grams | 1200 grams | 1200 grams |
| Aniline/Formaldehyde curing agent (see Example 1) | 138 " | 138 " | 138 " |
| Acetone | 2050 " | 1805 " | 1805 " |
| Water | 0 | 200 " | 0 |
| Dimethylformamide | 0 | 0 | 200 " |
| Fibreglass roving | 30 end strands | 30 end strands | 30 end strands |
| Roving Rate - ft./min. | 11.2 | 9.8 | 10.2 |
| Roving Tension - grams | 900 | 900 | 900 |
| Tower Temp.°C-bottom | 340 | 340 | 340 |
| Tower Temp.°C-middle | 325 | 325 | 325 |
| Tower Temp.°C-top | 300 | 300 | 300 |
| % Volatiles remaining | 0.2 | 0.2 | 0.3 |
| % Resin Pickup | 35.4 | 36.4 | 35.7 |

The product obtained from the above procedure, after being cut into 0.5 inch staples, was molded into ASTM Type I tensile bars at a molding temperature of 360°F, mold close time of 5 minutes with a 2 hour post cure at 300°F and had the following tensile properties.

|  | A | B | C |
|---|---|---|---|
| Ultimate strength at 25°C psi | 26,000 | 28,100 | 24,800 |
| % Elongation at failure | 0.73 | 0.72 | 0.59 |

From the above it will be seen that the materials are eminently suited for pipe fittings applications. In addition, it will be appreciated that formulation A, using one acetone as the solvent, permits the use of somewhat higher roving rates through the varnish solution. This is of substantial economic benefit.

Material produced in accordance with formulation A above in routine production runs normally displays a retained epoxy content of from 75 to 90 percent. That is, such material is B staged only to the extent of 10 to 25% thus indicating an even lesser tendency to advance when compared to solvent systems containing higher boiling components. The degree of advancement is measured by determining epoxy value. The raw material epoxy value in formulation A is an average of 0.19 e.g./100 gm. binder and the epoxy value of the dried material is an average of 0.17 eq./100 gm binder—a retention of 89%.

EXAMPLE 5

In order to determine the relationship between gradient tower temperature and roving rate necessary to obtain a product having the desired properties, the identical formulation was run at three different temperature ranges as follows:

| Varnish Formulation | | | | Grams |
|---|---|---|---|---|
| Araldite 7065 (See Example 1) | | | | 1200 |
| Aniline/Formaldehyde Curing Agent (See Example 1) | | | | 138 |
| Acetone | | | | 2050 |
| Fiberglass Roving | 30 end strand | | | |
| Fabrication Parameters | | I | II | III |
| No. of Rovings | | 4 | 4 | 4 |
| Tower Temperature, °C (°F) | Top | 200(392) | 300(572) | 400(752) |
| (Control setting) | Middle | 225(437) | 325(617) | 425(797) |
|  | Bottom | 240(464) | 340(644) | 440(824) |
| Roving Tension, kg/roving | | 1.0 | 1.0 | 1.0 |
| Roving Rate, ft/min | | 6.3 | 14.0 | 24.0 |
| Staple Length, inches | | 0.5 | 0.5 | 0.5 |
| Fabrication Test Results | | | | |
| Retained Volatiles, % | | 0.11 | 0.09 | 0.08 |
| Binder Pickup, % | | 32.8 | 35.6 | 38.0 |
| Varnish Epoxy Value - eq/100 g. | | 0.205 | 0.205 | 0.205 |
| Prepreg Epoxy Value - eq/100 g. | | 0.166 | 0.166 | 0.161 |
| Retained Epoxy Content, % | | 81.0 | 81.0 | 78.6 |

The results of the above are graphically demonstrated in FIG. 1 and it can clearly be seen that the relationship between average temperature under gradient conditions and roving rate is most linear - approximating $dr/dt = 0.0885$ feet per minute per degree Centigrade. Thus, for every 100°C (212°F) increase in average tower temperature, the roving rate increases approximately 8.85 feet per minute. As can be seen, low volatile retention level, together with high retained epoxy value, were obtained throughout the temperature and roving rate variations.

An additional observation should be made. It can be seen from the above example that as the roving rate is increased, the percent binder pick-up is increased. With a given roving rate, however, the binder pick-up remains constant and a uniform product is obtained. It is clear that, all things being equal, one way of increasing the binder level is to raise the roving rate. Although increased rate of substrate reduces the varnish dwell time which would tend toward a lower pick-up, this is overshadowed by a lower run off of the varnish during the drying so as to result in an effective increase in pick-up.

EXAMPLE 6

This example illustrates the proposition that the way in which the average tower temperature is arrived at is not critical. This example further illustrates the significance of roving rate in obtaining a desired product.

| Varnish Formulation | | | | Grams |
|---|---|---|---|---|
| Araldite 7065 | | | | 1200 |
| Aniline/Formaldehyde Curing Agent | | | | 138 |
| Acetone | | | | 2050 |
| Fiberglass Roving | 30 end strand | | | |
| Fabrication Parameters | | | | |
| No. of Rovings | | 1 | 1 | 1 |
| Tower Temperature, °C (°F) | Top | 160(320) | 160(320) | 180(356) |
| (Control setting) | Middle | 185(365) | 185(365) | 180(356) |
|  | Bottom | 200(392) | 200(392) | 180(356) |
| Roving Tension kg/roving | | 1.0 | 1.0 | 1.0 |
| Roving Rate, ft/min | | 6.0 | 8.6 | |
| Staple Length, inches | | 0.5 | 0.5 | 0.5 |
| Fabrication Test Results | | | | |
| Retained Volatiles, % | | 0.17 | 0.21 | 0.25 |
| Binder Pickup, % | | 31.6 | 32.4 | 32.9 |
| Varnish Epoxy Value - eq/100 g. | | 0.204 | 0.204 | 0.204 |
| Prepreg Epoxy Value - eq/100 g. | | 0.156 | 0.174 | 0.174 |
| Retained Epoxy Value, % | | 76.5 | 85.3 | 85.3 |

In this example, as in the previous examples, 25°C air was injected into the tower. The tower control settings were as indicated, resulting in a gradient temperature air column.

It can be seen from the above that a prepreg having a retained epoxy value of 85.3% and a retained volatiles level of 0.21 and 0.25% was obtained from a gradient temperature setting and a constant temperature setting, respectively, at the identical process parameters. It can further be seen that at a roving rate of 6 feet per minute a product having a retained epoxy value of 76.5% was obtained, indicating that at the temperatures employed a rate of 6 feet per minute was too slow to afford optimum properties.

EXAMPLE 7

In order to determine the relationship between isothermal tower temperature and roving rate necessary to obtain the product having the desired properties, the identical formulation was run at a variety of isothermal temperature ranges and roving rates as follows:

| Varnish Formulation | Grams |
|---|---|
| Araldite 7065 | 1200 |
| Aniline/Formaldehyde Curing Agent | 138 |
| Acetone | 2050 |
| Fiberglass Roving | 30 end strand |

In this example air at the bottom temperature was injected into the tower, resulting in an essentially isothermal temperature air column.

From the above, and from FIG. 1 where roving rate vs. isothermal temperature is graphically illustrated, it can clearly be seen that the relationship between average temperature under isothermal conditions and roving rate is linear - approximating $dr/dt = 0.151$ feet per minute per degree Centigrade. Thus, for every 100°C (212°F) increase in the tower temperature, the roving rate can be increased approximately 15 feet per minute. This represents an increase of some 71% over the rate obtainable under gradient conditions.

On the basis of the indicated data the following relationship between temperatures a roving rate was established, based on a linear function having a slope of 0.151

| Tower Average Temperature °C | Roving Rate ft/min |
|---|---|
| 300 | 20.1 |
| 310 | 21.7 |
| 320 | 23.2 |
| 330 | 24.7 |
| 340 | 26.2 |
| 350 | 27.7 |
| 360 | 29.2 |
| 370 | 30.7 |
| 380 | 32.3 |
| 390 | 33.8 |
| 400 | 35.3 |
| 410 | 36.8 |
| 420 | 38.3 |
| 430 | 39.8 |
| 440 | 41.3 |
| 450 | 42.9 |
| 460 | 44.4 |
| 470 | 45.9 |
| 480 | 47.4 |
| 490 | 48.9 |
| 500 | 50.4 |

TABLE 2

| Roving Rate, feet/minute | 10.0 | 12.0 | 14.0 | 17.0 | 14.0 | 18.0 | 21.0 | 24.0 |
|---|---|---|---|---|---|---|---|---|
| % Volatile Retention | 0.114 | 0.158 | 0.162 | 0.733 | 0.077 | 0.038 | 0.201 | 0.272 |
| % Binder Pickup | 32.81 | 35.83 | 36.30 | 39.10 | 38.20 | 33.49 | 38.00 | 38.64 |
| Tower Temp., Top, °C | 240 | 240 | 240 | 240 | 300 | 300 | 300 | 300 |
| °F | 464 | 464 | 464 | 464 | 572 | 572 | 572 | 572 |
| Bottom, °C | 260 | 260 | 260 | 260 | 325 | 325 | 325 | 325 |
| °F | 500 | 500 | 500 | 500 | 617 | 617 | 617 | 617 |
| % Epoxy Value Retention (Computer Results) | 63.36 | 78.52 | 105.74 | 81.46 | 38.11 | 74.81 | 83.50 | 89.97 |
| Roving Rate, feet/minute | 18.0 | 21.0 | 24.0 | 26.0 | 26.0 | 30.0 | 35.0 | 38.0 |
| % Volatile Retention | 0.095 | 0.148 | 0.155 | 0.132 | 0.094 | 0.086 | 0.189 | 0.304 |
| % Binder Pickup | 39.84 | 37.75 | 39.44 | 38.75 | 39.52 | 41.31 | 44.56 | 45.50 |
| Tower Temp., Top, °C | 325 | 325 | 325 | 325 | 370 | 370 | 370 | 370 |
| °F | 617 | 617 | 617 | 617 | 698 | 698 | 698 | 698 |
| Bottom, °C | 345 | 345 | 345 | 345 | 390 | 390 | 390 | 390 |
| °F | 653 | 653 | 653 | 653 | 734 | 734 | 734 | 324 |
| % Epoxy Value Retention (Computer Results) | 44.29 | 71.82 | 78.82 | 86.83 | 58.15 | 77.21 | 69.99 | 76.94 |

In computing the slope, data outside the following parameters were discarded:

| | |
|---|---|
| % Pickup | 32–41% |
| % Volatile Retention | 0–0.5% |
| % Retained Epoxy Value | 70–99% |

EXAMPLE 8

This example illustrates the properties of epoxy pre-impregnated chopped strand premixed molding compounds as a function of the staple length in inches.

The varnish of Example 7 was employed to prepare epoxy preimpregnated chopped strand premixed molding compounds having a binder level of 37.5 ±2.5%. The following table summarizes the properties at the various staple lengths. As used herein the term 'binder' refers to the chemically reactive ingredients.

TABLE 3

| Staple Length (In.) | Binder Level (%) | Bulk Density | Bulk Factor | Sp.Gr. Molded | % Retained Solvent | Flow PSI/Sec |
|---|---|---|---|---|---|---|
| | | no load/load | no load/load | | | |
| ¼ | 39.59 | .294/.357 | 6.12/5.04 | 1.80 | 0.38 | 950/29 |
| ½ | 39.07 | .345/.400 | 5.22/4.50 | 1.80 | 0.22 | 950/36 |
| ¾ | 39.53 | .333/.417 | 5.41/4.32 | 1.80 | 0.29 | 950/48 |
| 1.0 | 39.54 | .303/.371 | 5.94/4.85 | 1.80 | 0.28 | 950/48 |

Bulk density was determined in accordance with method C of ASTM standard D 1895–69. The results are reported before and after application of the test load. The bulk factor is similarly calculated according to ASTM standard D 1895–69.

Flow corresponds to the molding index according to ASTM designation D 737–67. The figure reported corresponds to the minimum force in pounds per square inch required to close the mold together with the closing time in seconds.

The bulk density of a chopped prepreg is highly significant in terms of its use and is of great significance to the final user. Bulk density represents weight per unit volume and if the weight per unit volume is too low, i.e., the material has a high bulk, then it will not easily fill a mold cavity. Molding cycles will have to include a preform step which may be undesirable in terms of ease and convenience of processing. In attempting to reduce the bulk density of the intermediate composites, composite free flow is often sacrificed. It can be seen that the desirable bulk density is one that will provide the greatest weight per unit volume consistent with free flow. Such materials have a bulk density of below about 0.20 and preferably below about 0.35.

Bulk factor is a unitless term which designates the ratio between density of the molding material and density of the final molded article. As a general proposition it is preferred that the bulk factor be below about 1.5 and preferably below about 1.20.

The molding index or flow is a response to the mold temperature and applied molding pressure. It is desirable to provide a reinforced molding compound that will afford flow at molding temperatures under relatively low molding pressures. The FIG. 950 PSI used in the Example is the lowest pressure afforded by this ASTM test method. Although the example employs 950 PSI molding pressure, it is possible to compresion mold at pressures below the 950 PSI test minimum. Another benefit derived from these high flow characteristics at low pressure is transfer molding capability.

EXAMPLE 9

A varnish was prepared according to Example 7, which formulation was modified to contain 25% of ECN 1280 (see Example 5). This varnish was used to prepare epoxy preimpregnated chopped strand premixed molding compounds having the binder levels indicated in the table below.

| Staple Length (in) | Binder Level (%) | Bulk Density gm/cm³ | Bulk Factor | Sp.Gr. Molded | % Retained Solvent | Flow psi/sec |
|---|---|---|---|---|---|---|
| | | no load/load | no load/load | | | |
| ½ | 25.23 | .263/.333 | 7.37/5.82 | 1.94 | 0.21 | — |
| ½ | 28.85 | .270/.357 | 7.02/5.30 | 1.89 | 0.15 | 1970/32 |
| ½ | 34.90 | .323/.395 | 5.72/4.79 | 1.84 | 0.22 | 950/46 |
| ½ | 36.82 | .357/.435 | 5.04/4.14 | 1.80 | 0.22 | 950/45 |

From the above it can be seen that the molding properties of the chopped prepreg are outstanding throughout a wide range of binder level.

It can further be seen that staple length has a less significant effect on flow than does binder level. It should also be noted that flow increases as binder level increases.

Chopped prepregs should have a bulk density below about 0.20 preferably below about 0.35, bulk factor below 1.5, preferably below about 1.20, a binder level from 25 to 50%, preferably from 30 to 40%, a staple length of from ¼ to one inch a retained solvent content below 0.5% preferably below 0.25%, a retained epoxy value above about 75%, preferably above 80 to 85% and the capacity of being moldable at 950 psi.

EXAMPLE 10

This example illustrates the impregnation of continuous glass cloth which can be used to manufacture laminates and which can be used in hand lay up applications as well as winding or other sheet molding applications. The impregnated cloth can, of course, be slit and chopped to yield reinforced molding compositions.

The glass cloth was impregnated with an impregnating solution as follows:

| | |
|---|---|
| Araldite 7065 | 120.8 oz |
| Aniline Formaldehyde Curing agent | 18.4 oz |
| Acetone | 208.8 oz |
| Orasole Red B 10.5% | 1 gram |
| Glass cloth | 1528 -cs-287 (cut to 3½ inch width) |

Fabrication Process

| | |
|---|---|
| Glass Tension grams pull | 500 |
| Tower Temperature °C(°F) | 400°C (752°F) Isothermal |
| Glass Speed ft/min | 32 |
| Traction Weight | 20Kg |
| Lip Setting inches | .020 |

Process Test Results

| | |
|---|---|
| Retained Volatile | 0.4 |
| Binder Pickup | 32.7 |
| Composite Epoxy Value | .0445 |
| Retained Epoxy | 77.2 |

Clark - Schwebel Fiber Glass Corp. - Has an epoxy compatable finish - 5.94 oz/sq.yd. Warp 42 Threads; Fill 32 Threads.

The impregnated glass cloth was evaluated for laminating application. This test included a determination of percent binder flow in the impregnated cloth as well as the molding of a copper clad board for peel strength. A laminate of four plys of 3⅝ inch by 3⅝ inch cloth were molded at 500 psi pressure for ten minutes in a press at 177°C (350°F). To obtain the percent of binder flow, a 3 inch diameter disc was punched from the cured laminate and checked for retained binder. Test results showed a 13.7% flow which is well within the range of commercial laminating prepregs.

Nine plys of 3⅝ inch by 6 inch glass laminate were prepared with one side to receive a copper cladding. The composite was molded using three minutes kiss cell at 177°C (350°F) and 50 psi then a ten minute cure at 177°C (350°F) and 500 psi. The composite was cooled at 66°C (150°F) in the press under 500 psi and thereafter removed and allowed to cool to room temperature prior to determining peel strength. A ¾ inch strip produced an average of 9.5 pounds pull at 2 inches per minute which amounts to 12.5 pounds per inch pull. This peel performance is well within the performance levels of commercially available systems and demonstrates the applicability of the high temperature impregnation technique thereto.

The following method was used to determine the epoxy value of the composites.

3.0 grams (±0.3 grams) of epoxy composite are accurately weighed to 0.01 grams by difference into a 300mm Erlenmeyer flask. To this is added 25mm of acetone and the mix is digested for 10 minutes or until the resin is dissolved as determined by visual inspection, 50mm of benzyl alcohol is added to the flask and the flask is assembled on a hot plate stirrer and brought to reflux while stirring vigorously. At this point 3.0 grams of potassium iodide dissolved in 5.0 grams of distilled water are added together with 20 drops of indicatoe solution (0.1 gram of bromphenol blue diluted to 100mm in N-propanol). Titration is thereafter begun with 0.5 normal hydrochloric acid. Titration is continued until the reference color disappears for 1 minute with the addition of one drop of HCL. During titration the reference color will slowly yield to a greenish or grayish hue and thereafter to a brown or yellow, indicating an excess of HCL. The excess reacts with KI to form HI which in turn adds to the epoxy groups. When the HI adds the solution will slowly return to the reference color. One minute is deemed an acceptable albeit arbitrary time in order to reduce the time of the test. The calculation is made as follows:

$$\text{Epoxy value, eq/100grams composite} = \frac{\text{mL HCl} \times \text{N NCl}}{\text{Sample wt, grams}} \times 10$$

The results are approximately 3 to 5% below theoretical and an acceptable deviation from the mean value with or ±2.0%.

The volatile content of the compositions is determined by the difference in weight before and after evaporative heating.

The binder level of roving and glass laminate systems is determined by ignition at 1300°F and the difference in weight.

In addition to the preparation of impregnated substrates for molding and laminating use, the process of this invention can also be employed to form an unsupported epoxy resin film or tape, useful in adhesive and laminating applications. Thus, when a continuous steel tape is passed through a bath of the varnish described in Example 7, which can be modified by the addition of suitable plasticizing materials if desired, such as liquid epoxy resins and other flexibilizers, and thereafter passed through an elevated temperature environment as described under preferably isothermal conditions and the solvent flashed therefrom and the resulting film subsequently stripped from the tape, there is obtained an unsupported curable epoxy resin film which can be used to form laminates. For example, this film can be layered alternately with glass cloth and/or copper foil, pressed and cured to form a laminate.

Similarly, a varnish, filled or unfilled, can be used in the above process and comminuted so as to form a dry powder suitable for powder coating or transfer molding applications, or an impregnant for a suitable reinforcing substrate.

What I claim is:

1. A method for making an epoxy composition which comprises dissolving an 1,2-epoxy resin containing two or more epoxy groups and a conventional curing agent therefor in a non-reactive solvent boiling at from 30° to about 100°C and thereafter exposing the mixture to a temperature of from 400° to 950°F to evaporate the solvent, the condition of temperature and time of exposure being so adjusted and controlled that the resulting composition has a retained solvent level below about 0.5%, and is substantially uncured.

2. A method according to claim 1 in which the epoxy resin is solid at room temperature.

3. A method according to claim 1 in which the mixture is spray dried.

4. A method according to claim 1 in which the mixture is coated onto an impervious support and dried at the high energy conditions to form a continuous film.

5. A method according to claim 1 in which the solution of resin and hardener additionally contains extenders and fillers, the resulting composition is coated onto an impervious support, dried at the high energy conditions and the resultant composition is comminuted to form a powder.

* * * * *